April 10, 1962 J. A. PICHON 3,029,374
METHOD AND APPARATUS FOR AUTOMATICALLY ADJUSTING
THE TORQUE DEMAND ON A ROTARY MOTOR
Filed May 22, 1958

INVENTOR.
JOSEPH ALBERT PICHON
BY
ATTORNEYS.

United States Patent Office 3,029,374
Patented Apr. 10, 1962

3,029,374
METHOD AND APPARATUS FOR AUTOMATICALLY ADJUSTING THE TORQUE DEMAND ON A ROTARY MOTOR
Joseph Albert Pichon, Champagnole, France
Filed May 22, 1958, Ser. No. 737,167
Claims priority, application France May 22, 1957
3 Claims. (Cl. 318—475)

The present invention relates to a method and apparatus for automatically rendering substantially constant the torque required of a rotary motor, and which is applicable to machinery of all kinds, such as in particular grain grinding machines, and machines for working wood, such as saws, planes and the like.

According to the present invention, a method of automatically adjusting the torque required of a rotary motor to its torque output which consists in the normally stationary part of the motor, e.g. the casing, being allowed to oscillate under the influence of the equal and opposite counter-torque against a turning moment applied thereto and the load applied to the motor being adjusted in dependence upon the angular displacement of said normally stationary part under the influence of the counter-torque.

In a preferred arrangement, a driving motor of a machine is mounted so as to oscillate about an axis coincident with the axis of rotation of its shaft and in mounting so as to oscillate with this motor a lever carrying a weight whose magnitude and/or spacing from the axis of oscillation are adjustable, which lever is connected mechanically, electrically or the like to a member controlling the rate of feed to the machine driven by said motor upon which rate of feed the torque required of the motor depends, the resistance opposed to the no-load position of the motor arising from the torque required of the motor effecting an equal and opposite counter-torque on the motor and, therefore, by means of the said lever, control of the rate of feeding of material to the machine according to the position and magnitude of the weight carried by the said lever.

When the position and magnitude of this weight have been determined so as to provide a turning moment appropriate to the torque required from the motor, there will be established during the course of work a position of equilibrium about which the motor and the lever oscillate to effect control of the feed to the machine and hence of the torque required in such a manner that the torque which is required of the motor corresponds to the torque output which must be provided by the motor. Moreover, in order to minimize continual oscillating displacement of the motor and of the lever about the equilibrium position, the said lever is preferably coupled to a shock absorbing device such as, for example, a telescopic shock absorber of the type used on mechanically propelled vehicles.

Moreover, according to a preferred embodiment, this apparatus has also a contactor which is mounted in series in the electrical circuit of the motor and which is engageable by said lever when the counter-torque is zero, the contactor being arranged to interrupt the current to the motor when engaged by said lever.

The invention will be further described by way of example in the following description with reference to the accompanying diagrammatical drawing representing one embodiment of the apparatus in which.

Figure 1:
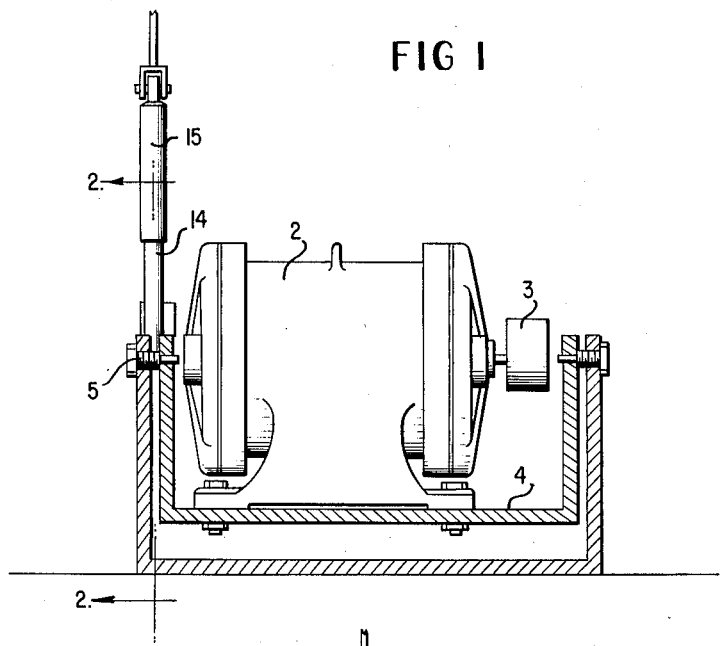
FIG. 1 is a front elevation of a motor according to the present invention.

In this drawing, 2 is a motor, the pulley 3 of which is intended to drive a machine, for example, a grain-grinder.

According to the invention, this motor 2 is not mounted directly on a fixed frame, but is carried by a bracket 4 in the form of a cradle which is mounted to be oscillatable about two pivots 5, which pivots are coaxial with the axis of rotation of the shaft of motor 2.

To one of the sides of the cradle 4 there is attached a lever 6 which, at its end, carries a shoe 7 having the form of an arc of a circle, the center of which coincides with the axis of the pivots 5; this shoe has a throat 8 to the upper end of which is attached at 9 a cable 10. At a fixed point on the casing of the motor 2 there is disposed a weight 13 providing a static counterbalance for the unit comprising the motor 2, the cradle 4 and the lever 6.

Hooked to the end of the cable 10 remote from the shoe 7 is a weight 12 of predetermined magnitude according to the torque required from the motor 2, the unit consisting of the motor 2, the cradle 4 and the lever 6 being thereby displaced in an anti-clockwise direction until the weight 12 is in abutment with the flooring.

If now the grinder is fed with grain, it will be seen that as soon as the motor 2 drives the grinder under load there is produced a counter-torque tending to displace the unit formed of the motor 2, cradle 4 and lever 6 in an opposite direction to the direction of the rotation of the motor shaft, that is to say, a clockwise acting torque, until finally the lever 6 occupies an equilibrium position such as that shown by the full lines in FIG. 1, when the clockwise-acting counter-torque is balanced by the turning moment of the weight 12 on lever 6.

Should the load on the grinder increase, the reversing torque of the apparatus comprising the motor 2, the cradle 4 and the lever 6 increases in such manner that the lever 6 tends to rise still further. If, therefore, the lever 6 is connected mechanically or electrically to the member controlling the rate of feed to the grinder, this rate of feed can be regulated according to the position of the lever 6. Thus, if the lever 6 rises beyond an equilibrium position, according to the product to be ground, such as beyond the position shown in FIG. 2, a reduction of the rate of feed to the grinder can be arranged to occur and similarly if the lever 6 descends below the equilibrium position, an increase in the rate of feed to the grinder can be arranged to occur.

Figure 2:
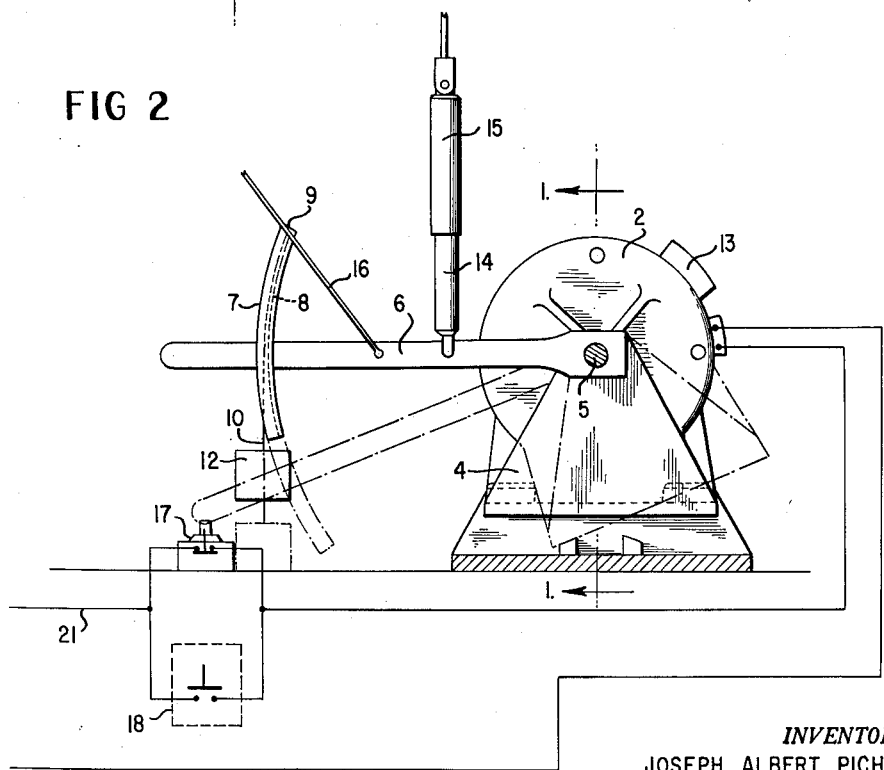
FIG. 2 is a side elevation.

In practice a continual oscillatory movement of the lever 6 will occur on both sides of an equilibrium position such as the position shown in FIG. 2. To minimize this oscillation, it is desirable to connect to the lever 6 the moving part 14 of the shock absorber 15, the shock absorber being, for example, of a telescopic type.

The control of the rate of feeding to the grinder by the lever 6 may be effected, for example, by a system of rods 16 supported on this lever.

Electric power is supplied to motor 2 through electric supply lines 21 and 22 connected to a suitable power source, not shown. During normal operation of motor 2, lever 6 is in approximately the full line position shown in FIG. 2, and current flows to the motor through line 21 and the normally closed contacts of switch 17. Switch 17 is located to be depressed by the outer end of lever 6 when the load on motor 2 is reduced to zero, as by stopping feed of grain to a grinder operated by the motor. When no load is applied to motor 2, arm 6 is located in the broken line position of FIG. 2 and switch 17 opens the electric supply circuit to the motor.

To start motor 2 when the contacts of switch 17 are opened, a manually actuated start switch 18 is depressed by the operator to complete the circuit to motor 2 by bypassing the contacts of switch 17 through the contacts of switch 18. The operator holds switch 18 depressed until lever 6 is swung upwardly into its normal operating position, thus permitting the contacts of switch 17 to close.

In the arrangement shown in FIG. 2, the contactor 17 is operated directly by the lever 6, but the contactor 17 may also be operated indirectly as by a rod connected to lever 6. Thus, when the grinder is no longer being fed, the motor 2, then idling, is no longer subjected to a countertorque, with the result that the lever 6 adopts a position such as that shown in dotted lines in FIG. 2, in which position it presses on the contactor 17 or actuates the aforementioned rod to interrupt the current to the motor.

The apparatus of the present invention thus makes it possible, for example, to grind with the same grinder maize, barley, oats, oil cake, carob beans or the like products, without adjustment of the controls being necessary, and by making use of a substantially constant torque output from the motor 2.

It is to be noted, however, that this device may be applied not only to motors driving grinders, but also to those driving various machines such as in particular machines for working wood such as band saws, reciprocating saws or planes.

With regard to machines for working wood, apparatus constructed according to the present invention does not require the constant supervision which is at present necessary for controlling the rate of feed according to the dimensions of the wood to be sawed, its hardness and the sharpness of the blades so as to obtain at one and the same time good sawing and a good yield.

The present invention is not limited to the one embodiment of this apparatus described and to only the uses which have been indicated above by way of example but includes all variations.

What I claim is:

1. Apparatus for adjusting the torque required of a rotary motor to its output torque comprising a cradle, a rotary motor fixedly mounted upon said cradle, means supporting said cradle for rotary oscillation about the axis of rotation of said motor, means for coupling said motor in driving relationship with a variable load, a lever fixed to said cradle and projecting radially from the axis of rotation of said motor, means on said lever for applying a turning moment to said cradle in the direction of torque output of the motor to resist the counter torque moment applied to said motor, cradle and lever by the load coupled thereto, and means coupled to said lever for adjusting the magnitude of the variable load applied to said motor in accordance with the magnitude of counter torque exerted upon said motor by the load.

2. Apparatus as defined in claim 1 comprising a mass mounted upon said motor to counterbalance the static moments exerted by said motor, cradle and lever, said means on said lever for applying a turning moment to said cradle comprising an arcuate shoe fixed upon said lever and having an outer surface lying on an arc centered upon said axis of rotation, and a weight suspended by a flexible suspension element from the upper end of said shoe, said flexible element lying upon said outer surface whereby the turning moment exerted by said weight remains constant independent of the angular position of said lever.

3. Apparatus as defined in claim 1 comprising shock absorbing means for damping the rotary oscillation of said cradle, motor and lever upon said supporting means.

References Cited in the file of this patent

UNITED STATES PATENTS

| | | |
|---|---|---|
| 1,949,119 | Gibbs | Feb. 27, 1934 |
| 2,387,533 | Schmucker | Oct. 23, 1945 |
| 2,526,373 | Le Clair | Oct. 17, 1950 |